United States Patent Office 3,522,510
Patented Aug. 4, 1970

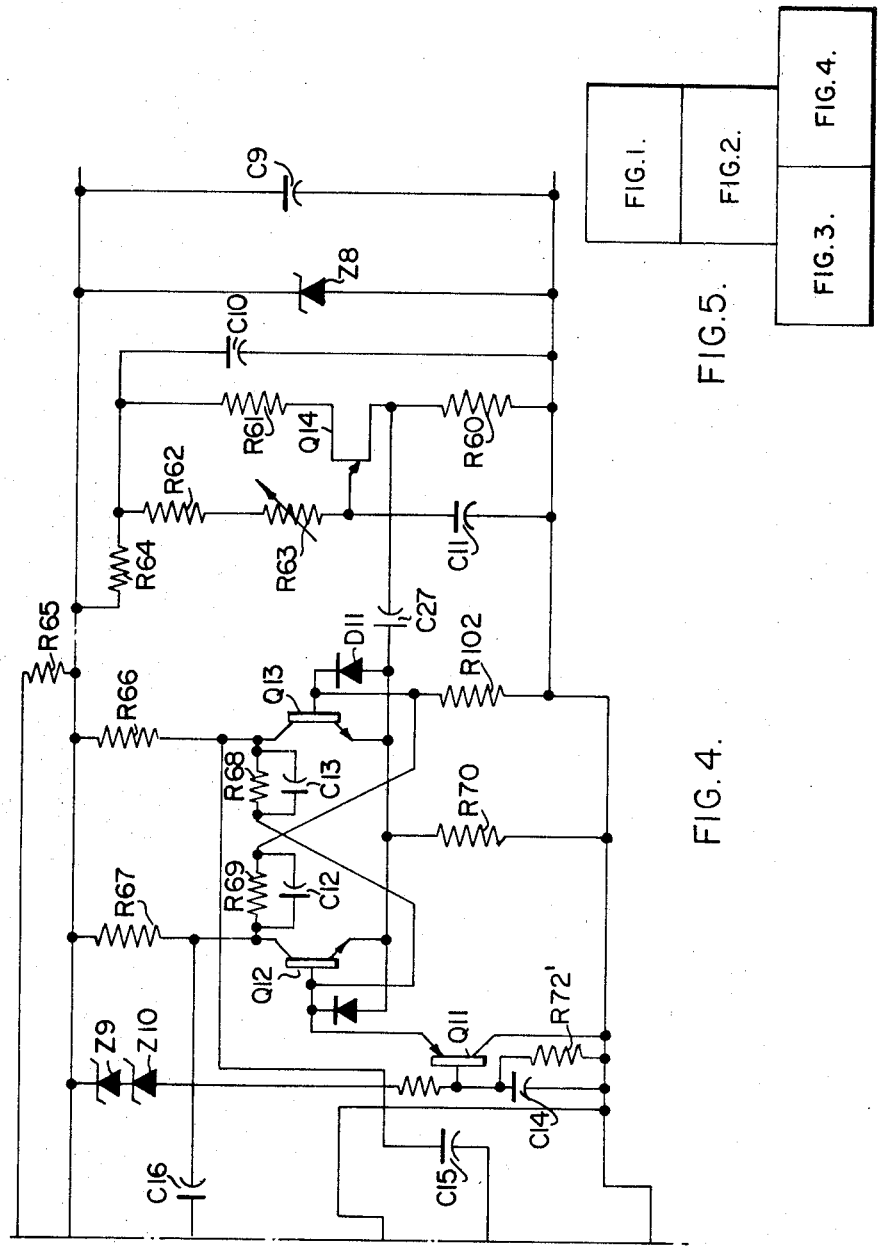

3,522,510
DC TO DC CONVERTER
Douglas R. G. Cameron, Montreal, Quebec, Canada, assignor to Pylon Electronic Development Company, Ltd., Lachine, Quebec, Canada
Filed Oct. 31, 1968, Ser. No. 772,286
Claims priority, application Canada, Nov. 7, 1967, 4,437
Int. Cl. H02m 3/22, 1/18, 7/52
U.S. Cl. 321—2                           12 Claims

ABSTRACT OF THE DISCLOSURE

A DC to DC converter wherein a source of DC voltage charges a capacitor which is periodically discharged alternately through first and second halves of a transformer primary winding wound on a saturable magnetic core. The winding halves are connected in series with SCR's which are alternately triggered on by pulses derived from a flip-flop driven by a unijunction oscillator, means are provided for causing the capacitor to always discharge through whichever winding half will tend to drive the core away from a previously saturated state. A substantially square-wave voltage is produced on a secondary winding on the transformer and this is rectified, filtered and regulated to produce a DC output.

BACKGROUND OF THE INVENTION

This invention relates to DC to DC converters.

In certain types of equipment, for example in telephone exchanges, there is provided a battery adapted to provide a DC voltage at a certain voltage level or within a certain voltage range. The battery requires equipment for charging it and regulating its output. Such equipment is costly and requires a certain amount of maintenance. In some cases it is desired to have a DC voltage at a different voltage or voltage range than that provided by the battery. Rather than provide a separate battery, it is desirable to be able to derive the second voltage from the first as a second battery would also require equipment for charging it and regulating its output. This may be done by means of a DC to DC converter. Such a converter should, preferably, have no moving parts, be of relatively low weight, and require little or no maintenance.

SUMMARY OF THE INVENTION

The present invention provides a static DC to DC converter of low weight having no moving parts, aside from an on-off switch and a few potentiometer adjustments.

According to the present invention there is provided a DC to DC power supply wherein a source of DC voltage charges a capacitor and wherein said capacitor is periodically discharged alternately through first and second halves of a transformer primary winding wound on a saturable magnetic core. The first and second winding halves are connected in series with first and second silicon controlled rectifiers respectively. Means is provided for causing said capacitor to first discharge through one half of the primary winding when the power supply is initially turned on and for causing said capacitor to discharge through the other half of the primary winding when the power supply is turned off. By this means, the capacitor is prevented from discharging through that half of the primary winding which will drive the core towards saturation in the sense caused by the immediately preceding capacitor discharge. In other words, current surges from the battery to the transformer always flow through the side of the transformer that is not saturated. It is inadvisable to start an inverter or converter by allowing a current surge from the battery to travel through a side of the transformer that is saturated as this can cause what is known as "shoot-through." The phenomenon called "shoot-through" pertains to a surge of current charging through atransformer winding where there is very little or no $$-L\frac{di}{dt}$$

to buck the surge. "Shoot-through" can cause a short circuit on the battery of the converter.

During normal operation of the DC to DC power supply according to the invention, the first and second silicon controlled rectifiers are alternately triggered on by pulses supplied via first and second firing trains, respectively, the pulses being derived from a flip-flop which is alternately triggered into first and second conduction states by means of a unijunction oscillator connected thereto.

The aforementioned flip-flop preferably comprises first and second transistors and the means for causing the capacitor mentioned above to first discharge through one half of the primary winding comprises means maintaining the second transistor of the flip-flop conductive and the first transistor nonconductive until said capacitor has charged to a voltage substantially equal to the voltage of the DC source at which time the second transistor is made conductive and the first transistor non-conductive whereby the second transistor applies a pulse via the second firing train to the gate of one of the silicon controlled rectifiers which is thus rendered conductive so that the capacitor discharges through a given half of the primary winding.

The silicon controlled rectifiers preferably have voltage surge suppressors connected between their anodes and cathodes.

The aforementioned capacitor is periodically discharged at a first repetition rate. The transformer is provided with a secondary winding connected to a full-wave bridge rectifier having two diodes and third and fourth silicon controlled rectifiers. The transformer also has an auxiliary winding connected to a full-wave control bridge rectifier having a pulsating DC output at said first repetition rate. The output of the control bridge rectifier energizes a unijunction oscillator adapted to provide at its output pulses having a second repetition rate higher than said first repetition rate. Means are coupled to the output of the unijunction oscillator and to the gate electrodes of the third and fourth silicon controlled rectifiers to make conductive that silcion controlled rectifier having its anode-cathode path forward biased.

Means are preferably provided for disabling the unijunction oscillator after it produces a pulse at the beginning of each pulse at said first repetition rate received from said control bridge rectifier. The disabling means maintains the unijunction oscillator disabled until the end of the pulse received from the control bridge rectifier.

The output of the power supply may be provided with sensing means adapted to produce an output voltage upon sensing a voltage in excess of a predetermined voltage. The output voltage from this sensing means is adapted to disable the unijunction oscillator.

The invention will now be further described in connection with the accompanying drawings, in which:

BRIEF DESCRIPTION OF THE DRAWING

FIGS. 1 to 4 together form a complete circuit diagram of a DC to DC converter according to the invention, FIG. 1A shows a wave form useful in explaining the operation of the circuit shown in FIGS. 1 to 4, and FIG. 5 shows approximately how FIGS. 1 to 4 fit together to form the complete circuit diagram of the DC DC converter.

DESCRIPTION OF THE PREFERRED EMBODIMENT

Figure 3:
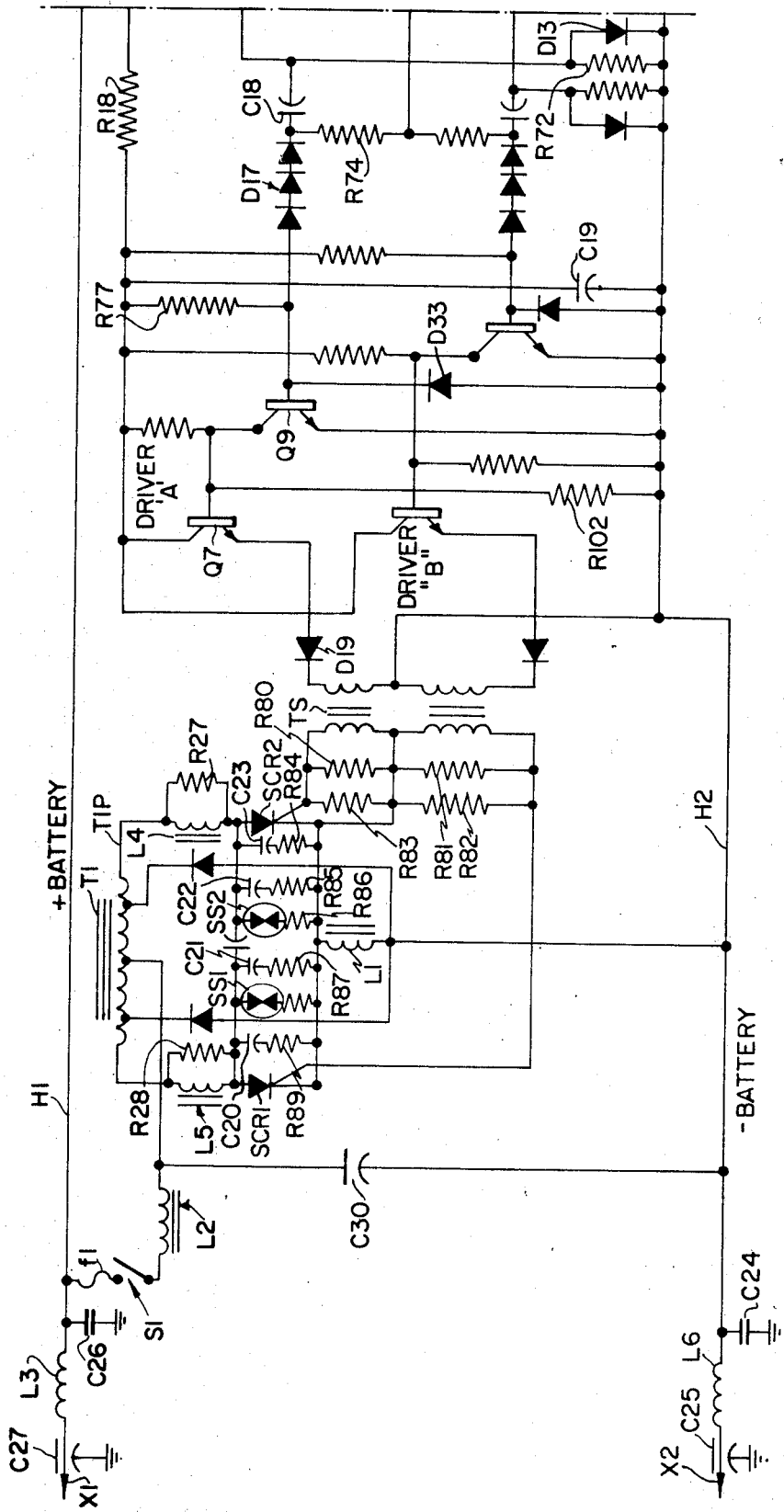

Referring to FIG. 3, the circuit is adapted to be energized by a battery (not shown) connected to terminals X1 and X2. The circuit is energized upon closure of switch S1 connected to line H1 through a fuse f1 and to line H2 through an inductor L2 and capacitor C30. Line H1 connects to the positive terminal X1 through an inductance L3 and a grounded shield indicated as capacitor C27 and line H2 connects through an inductance L6 and a grounded shield C25 to the negative terminal X2. Capacitors C24–C27 and inductors L3 and L6 constitute an R.F. filter which protects the battery from receiving any R.F. from the circuit. Inductor L2 helps to prevent audio-frequency signals from reaching the battery.

Figure 1:
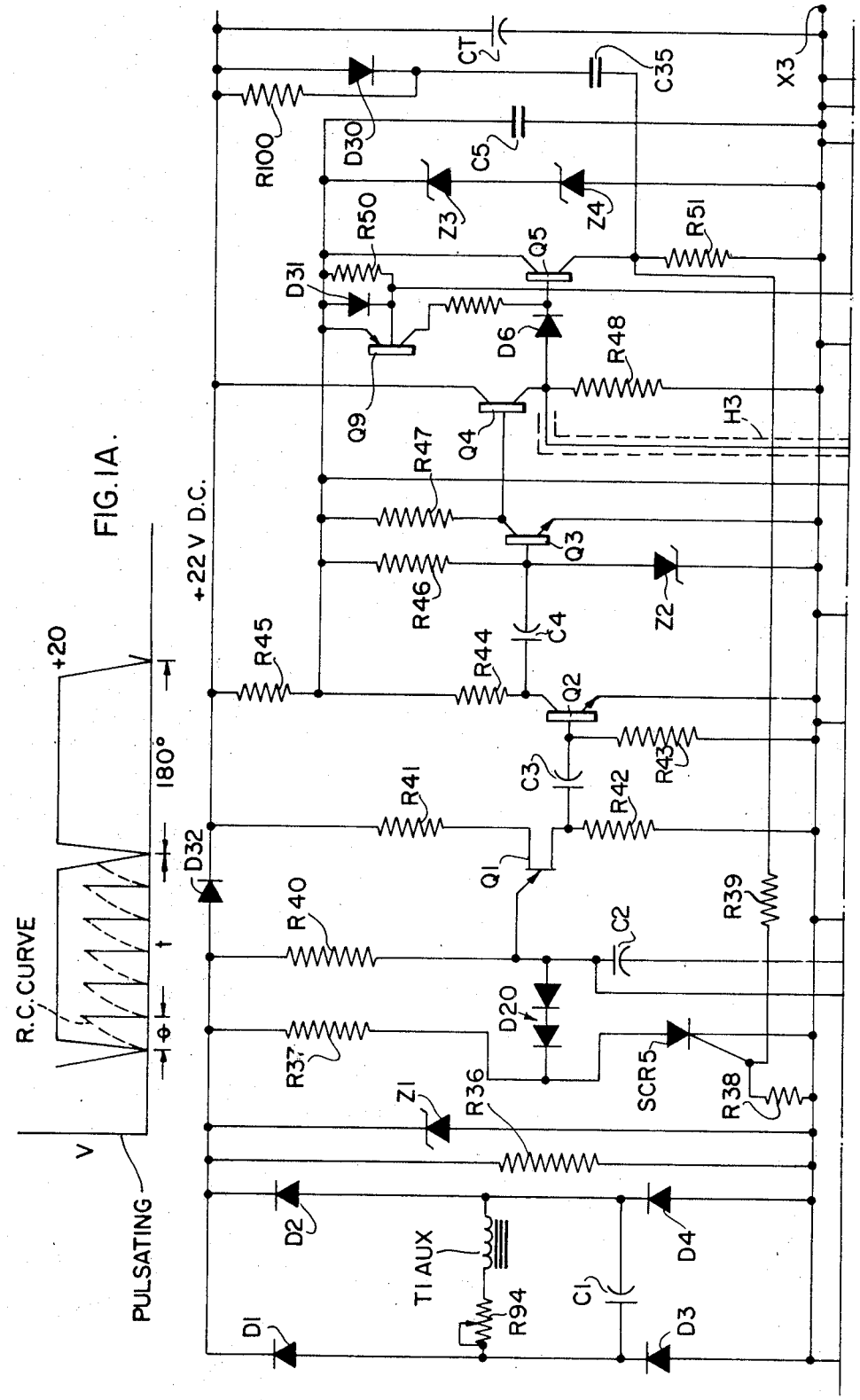

Capacitor C30 is adapted to be charged by the battery and to be alternately discharged through first one and then the other half of the primary winding T1P of transformer T1. Capacitor C30 is alternately charged and discharged to produce, as will be explained hereinafter, a substantially square-wave current through the transformer primary winding T1P. This induces a square-wave voltage in the secondary winding T1S (FIG. 2) of transformer T1, which is rectified, filtered and regulated to produce an output voltage at terminals X3 and X4, shown at the lower right-hand corners of FIGS. 1 and 2, respectively. Strictly speaking, the wave form is not square but rather trapezoidal, as shown in FIG. 1A.

Assuming the silicon controlled rectifier SCR2 (FIG. 3) has a positive pulse applied to its gate electrode via driver A, to be described subsequently, capacitor C30 will discharge via a path including the right half of transformer primary winding T1P, inductor L4 in parallel with resistor R27, the anode-cathode path of SCR2 and inductor L1. On the other half cycle, with a pulse applied to the gate of SCR1 via driver B, capacitor C30 discharges via a path including the left half of the primary winding T1P, inductor L5 in parallel with resistor R28, the anode-cathode path of SCR1 and inductor L1. The silicon controlled rectifiers SCR1 and SCR2 are alternately triggered "on" by pulses applied to their gate electrodes by drivers B and A, respectively. As will be explained below, these pulses from drivers A and B are derived from a flip-flop which is triggered into alternate conductance states by a unijunction oscillator.

Referring to FIG. 4, unijunction Q14 is set to pulse at a certain rate, e.g. 800 pulses per second, the pulse repetition rate being determined by the time constant of the series combination of capacitor C11, variable resistor R63 and resistor R62 and being adjustable by means of R63. The resulting pulses formed across resistor R60 are coupled by means of capacitor C27 to the base of the flip-flop comprised of transistors Q12 and Q13 and associated passive circuit elements. Diode D11 acts as a negative spike clipper for the base-emitter of transistor Q13. The collector of Q12 is coupled to the base of Q13 by R69 in parallel with C12 and the collector of Q13 is coupled to the base of Q12 by R68 in parallel with C13. R67 and R66 are flip-flop collector resistors connected to the collectors of Q12 and Q13 respectively. Thus, with a pulse repetition rate of 800 pulses per second imposed on the flip-flop, it will oscillate at 400 cycles per second. By this means, the 400 cycles per second square-wave generated at the collector of Q12 is 180° out of phase with the 400 cycles per second square-wave generated at the collector of Q13.

Capacitor C9 functions as a filter capacitor for the flip-flop voltage supply while Zener diode Z8 provides the primary voltage control. Resistor R65 determines the current through Zener diode Z8.

Capacitor C10 is a filter capacitor for the unijunction oscillator and works in conjunction with resistor R64 as an RC filter. Capacitor C16 couples the square-wave generated at the collector of Q12 to resistor R72 (FIG. 3). Capacitor C16 and resistor R72 comprise a differentiating network that reacts to both a rise in voltage and a fall in voltage at the collector Q12. The positive going pulses at the collector of Q12 are shorted to ground by diode D13 in parallel with resistor R72. The negative going pulses generated at the collector of Q12 are passed on to another differentiating network comprised of capacitor C18 and resistor R74. The latter network plays a part in the further refinement and shaping of the pulses desired. Thus, across resistor R74, there appear negative voltage spikes of narrow width. However, diode D13 is only able to short circuit part of the positive pulse applied to it due to its own forward voltage drop. Thus, a small positive voltage disturbance can occur which, if allowed to go through driver A, would cause double triggering on SCR2. Therefore, diodes D17 (three shown although the exact number used is not critical and depends on the type of diodes used) are employed as threshold diodes to block the remnants of the positive pulse clipped off by diode D13. Therefore, at the lower end of resistor R77 there appear substantially only negative going pulses. Resistor R77 acts as a hold-on resistor to transistor Q9. That is, in the interpulse period, Q9 conducts direct current. However, when a negative pulse is applied to the base of Q9, it switches off at a very rapid rate and causes a positive going pulse to be generated on its collector. This positive going pulse receives current amplification by means of emitter follower Q7 and is passed on through diode D19 to the primary winding of transformer T2 which is a ferrite pulse transformer for silicon controlled rectifier gate usage. Transistor Q7 may be termed "driver A." Thus, the above described firing train may be referred to as the A firing train. The B firing train, which includes transistor Q8, behaves in a similar manner so that no detailed explanation of it is necessary.

Resistor R102 is a base tie-down resistor which bypasses the base of Q7 so as to reduce pulse height and absorb noise.

Diode D33 is connected as a negative pulse clipper. It prevents excessive negative drive to the base-emitter junction of Q9 while still permitting switching action.

R18 is an RC filter component comprising R18 and C19 which helps to smooth the supply to the pulse drive voltage feed line.

R82 and R83 are gate bias resistors and R80 and R81 are hold down resistors for the secondaries of transformer T2.

By the use of the above circuitry and the flip-flop as described, it is possible to generate fast rising positive pulses to be utilized in triggering the silicon controlled rectifiers SCR1 and SCR2 180° out of phase with respect to each other at a frequency of 400 cycles per second, if, as assumed above, the unijunction operates at 800 cycles per second. Naturally, other operating frequencies could be selected.

Consideration will now be given to transistor Q11 (FIG. 4) and its function in the circuit. Transistor Q11 is connected as a switch which is able to tie the base of transistor Q12 directly to ground by means of a discrete network connected in its base circuit. It is desired to hold back the firing train until capacitor C30 (FIG. 3) is brought up to full battery voltage so that initiation of firing can be controlled by transistor Q11. In other words, transistor Q11 acts as a hold-back to the flip-flop to first enable full voltage to be imposed upon the transformer T1 and storage capacitor C30. During start-up, build-up of the voltage supply to the control of SCR1 and SCR2 lags behind the charging of capacitor C30. It is undesirable to allow random triggering of SCR's in an inverter circuit. That is, SCR1 (for example), should be the first SCR to fire during start-up and SCR2 should be the last SCR to fire during close-down. By this means, current urges from the battery to the transformer always flow through the side of the transformer that is not saturated. As mentioned previously, it is inadvisable to start an inverter by allowing a current surge from the battery to travel through a side of the transformer that is saturated as this can cause what is known as "shot-through." Zener diodes Z9 and Z10 block early action of Q11. Capacitor C14, in conjunction with R72', acts to delay "switch off" of Q11 after threshold voltage is exceeded via Z9 and Z10.

Referring to FIG. 3, it may be noted that each SCR, SCR1 and SCR2, has connected across it two different RC networks and one surge suppressor in series with a current limiting resistor. That is, SCR1 has RC networks R89–C20 and R87–C21 connected across it and also has a surge suppressor SS1 in series with resistor R88 connected across it. Silicon controlled rectifier SCR2 has connected across it the two RC networks R84–C23 and R85–C22 as well as surge suppressor SS2 in series with resistor R86. The RC series networks shown are selective to transients with different rise times. However, one RC network for each SCR may be sufficient. In fact, it has been found sufficient to connect a resistor in series with a surge suppressor across each SCR, together with a capacitor in parallel with the surge suppressor. The surge suppressors may be Siemen's type A230 suppressors which are capable of handling up to 10,000 amps instantaneously. Theshold voltage is in the vicinity of 230 volts. Thus, any voltage spikes over 230 are dissipated in the resistors in series with the surge suppressors. By this means, control is exerted over high voltage spikes which may be generated across the SCR's.

Figure 2:
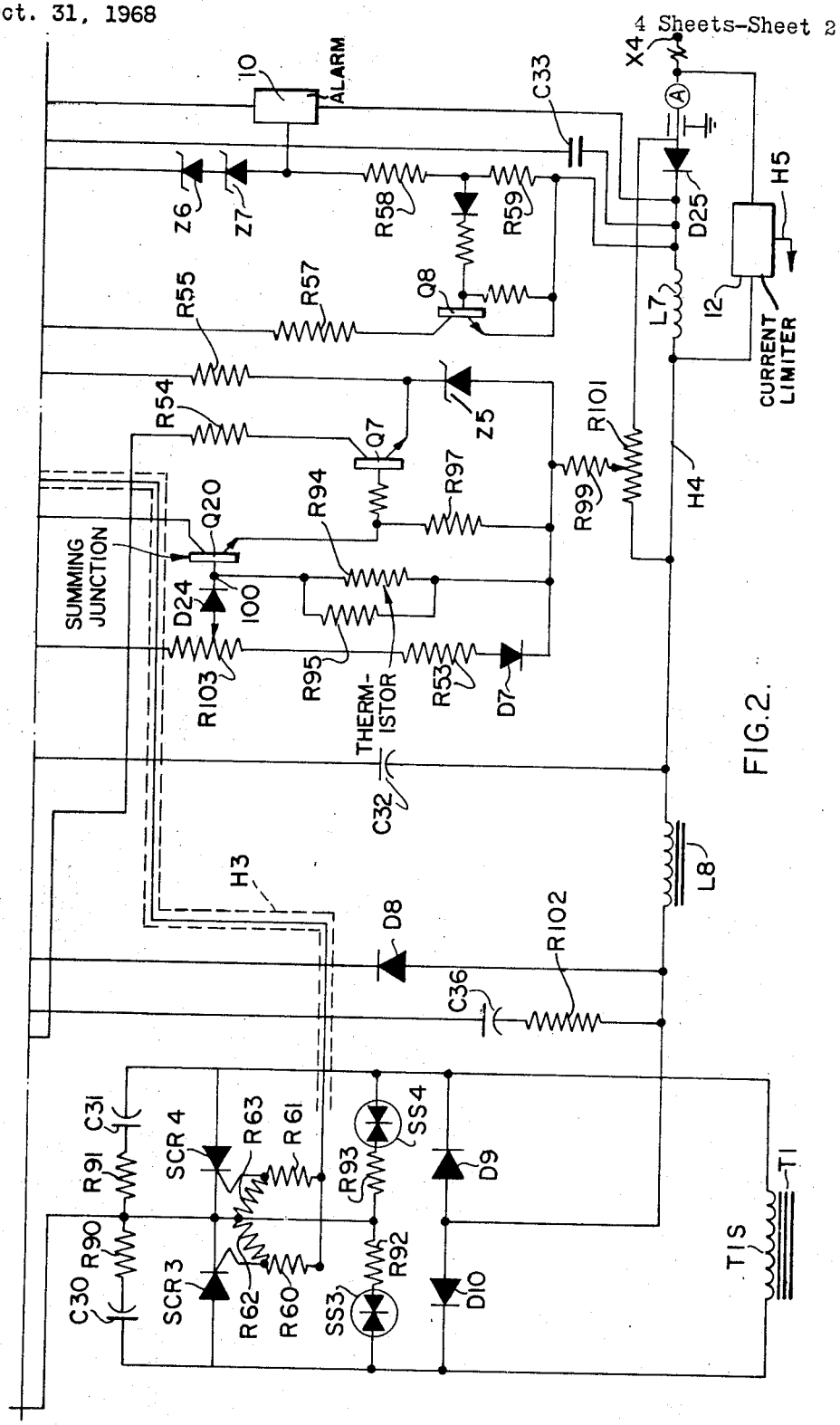

Referring now to FIG. 2, the converter portion of the system comprises a full-wave bridge having two active legs. The active legs comprise silicon controlled rectifiers SCR3 and SCR4 while the inactive legs comprise diodes D9 and D10. Note that the firing network for SCR3 and SCR4 is connected in parallel to resistors R60 and R61 and resistors R62 and R63. This simplifies the gate circuit and is permissible since there is a redundant pulse during each half cycle for each SCR gate circuit and this redundant pulse occurs when the SCR to which it is applied is back-biased and cannot conduct. The voltage delivered by the secondary T1s of transformer T1 is a square-wave or, strictly speaking, a trapezoidal wave, as illustrated in FIG. 1A. When the anodes of the SCR's are positive, they will conduct when their gates are energized through resistors R60 and R61. R62 and R63 are gate hold-down resistors. R62 and R63 allow a reduction in turn-off time of the SCR's and increased holding current. They are sometimes referred to as "external gate-cathode shunts."

C30 and C31 are transient by-pass capacitors while R90 and R91 are transient current limit resistors. Transients which might damage SCR3 or SCR4 are dissipated in resistors R90 and R91. SS3 and SS4 are over-voltage breakdown devices which can handle heavy transients. Resistors R92 and R93 in series with SS3 and SS4 respectively dissipate transient energy and limit transient current.

Diode D8 is a "free wheeling" diode. Its function is to return reactive energy of opposite polarity to the circuit and thus reduce the voltage across the rectifiers.

C36 and R102 absorb noise and objectionable AC components from the output of the rectifiers.

L8 functions as an inductive input filter.

R53 is a feedback bias resistor selected to have a value so that the potentiometer slider connected to D24 is centered for nominal output and is well back from its end positions to allow adjustment over a complete range of output voltage.

R97 is an emitter follower feedback resistor; it stabilizes the input to Q7 and loads Q20.

Zener diode Z5 is a reference input Zener. It represents a "set point" with voltage control set at the feedback potentiometer R103.

R54 is the collector resistor of Q7 and is selected so as to shunt C2 at the emitter of Q1 through the full load range.

R55 is a resistance arm of a bridge formed by the feedback net and Z5. It also functions to bias Z5 and the emitter of Q7.

C32 is a filter component, part of a $\pi$ filter.

Diode D7 is a silicon diode with temperature characteristics matching those of D24 and the base-emitter of QZ0 in compensating mode.

C33 is an output filter capacitor and is a component of a $\pi$ filter.

Referring to FIG. 1, an auxiliary winding T1 aux. of transformer T1 supplies a square-wave alternating current at 400 cycles per second to the AC input of a full-wave bridge comprised of diodes D1 to D4 and capacitor C1. Resistor R94 is a variable resistor for calibrating the voltage output of the bridge. The output of this bridge is pulsating and Zener diode Z1 clips this voltage to a predetermined level so that the resulting output comprises a series of pulses having an amplitude of, for example, 20 volts, as shown in FIG. 1A. Resistor R36 acts to load the bridge and clarify the output of the bridge, i.e. it absorbs noise and "ringing" due to high frequency components in the pulsating voltage, without it, the waveform would not be "clean."

Referring now to unijunction transistor Q1 (FIG. 1), it is to be noted that resistor R40 is the timing resistor and capacitor C2 is the timing capacitor. That is, these two elements primarily determine the pulse repetition rate of Q1 although, as will be explained subsequently, the charging rate of C2 can be affected by Q7 for example to thereby affect the pulse repetition rate of unijunction Q1. SCR5 is a silicon controlled rectifier that is capable of disenabling the emitter of transistor Q1 through the series connected diodes D20. Resistor R37 is a current hold-on resistor necessary to sustain hold-on current through SCR5 once it is rendered conductive. Capacitor C3 couples the pulses generated across R42 (by means of the unijunction Q1) to the base of transistor Q2. Resistor R43 acts as a hold-off resistor for transistor Q2 and normally prevents Q2 from conducting. However, when a positive pulse passed by capacitor C3 reaches the base of transistor Q2 it causes transistor Q2 to saturate and its collector voltage falls to a low level at a very rapid rate. Transistor Q3 is a chopper normally held on by resistor R46. However, negative going pulses passed from the collector of Q2 to the base of Q3 by capacitor C4 cause transistor Q3 to switch off with a very fast rise time. The resulting series of pulses thus generated at the collector of transistor Q3 is passed on through emitter follower Q4 and the firing network of SCR3 and SCR4 (FIG. 2) via shielded lead H3.

It will also be noted that the emitter of transistor Q4 is connected through a diode D6 to the base of transistor Q5, also connected as an emitter follower. Transistor Q5 is selected to have a "beta" such that it does not appreciably load transistor Q4. Square-wave firing pulses are delivered to resistor R51 by transistor Q5 and are fed back through resistors R39 and R38 to the gate of SCR5. Thus, when the first firing pulse originating from unijunction Q1 goes through the firing train, it causes SCR5 to fire from the emitter of transistor Q1 through diodes D20 thus disenabling unijunction Q1. The hold-on current of SCR5 is limited by R37 to a nominal value. SCR5 will reset itself (stop conducting) at the end of the firing cycle by virtue of the fact that a pulsating voltage is applied to its anode with distinct cleavage between adjacent pulses. Cleavage refers to the separation between adjacent pulses or "bits" and may readily be observed in the wave form shown in FIG. 1A. Thus, it is seen that SCR5 is capable of switching off the action of unijunction transistor Q1.

Without SCR5, the unijunction Q1 would fire several times during each "bit" of the 400 cycle pulse train applied to the anode of SCR5. Referring to FIG. 1A, it may be seen from the RC curve (not to scale) that the unijunction Q1 could fire several times during a single "bit" of the pulse train applied to the anode of SCR5. SCR5 ensures that unijunction Q1 only fires once during each "bit" as indicated by the hatched portion of the RC curve which, of course is the charging curve for capacitor C2.

Diode D32 functions as a rectifier. To the left of D32 the line voltage is pulsating at, for example, 800 cycles per second. To the right of D32, the line has direct current to the peak pulsating value as held up by filter capacitor C7. Filter capacitor C5 functions as storage for the low level voltage feed line corrected to Q2, Q3, Q9 and Q5, the voltage being, for example, 15 volts. Z3 and Z4 are Zener diodes having a combined spillover voltage of about 15 volts.

R41 supplies base 2 bias to unijunction transistors Q1. R45 is a dropping resistor which regulates the current through Z3 and Z4. R44 is the collector resistor of Q2; it provides negative going pulses to C4. R47, the collector resistor of Q3, provides positive going pulses to the base of Q4 when C4 applies negative pulses to the base of Q3. Z2 is a Zener diode that clips the negative pulses applied to the base of Q3 at a suitable value such as 7 volts.

The circuit according to the invention also provides for triggering of SCR5, and hence cessation of firing pulses to the gates of SCR3 and SCR4 by disabling unijunction Q1, if the output voltage of the converter rises above a predetermined value. Note that Zener diodes Z6 and Z7 (FIG. 2) are connected in series with resistors R58 and R59 between lines H2 and H4. The combined spill-over voltage of Z6 and Z7 in series is selected at a predetermined value, e.g. 28 volts, related to the maximum allowable output voltage between terminals X3 and X4. If this voltage is exceeded in the output due to overshoot or loss of control, current will flow through resistors R58 and R59 consequently trigger transistor Q8, i.e. turning Q8 on. The base of Q8 is connected to the junction of R58 and R59 via a resistor and diode in series. The collector of Q8 is connected via R57 to the base of Q9 (FIG. 1) which is a PNP-transistor connected in switching mode so that when transistor Q8 turns on, the emitter voltage of Q9 becomes higher than at its base voltage by virtue of voltage divider action between resistors R50 (FIG. 1) and R57 (FIG. 2). It may be noted that a clamping diode D31 is connected in parallel with the emitter-base section of transistor Q9. At a voltage greater than 28 volts (or whatever predetermined output voltage is involved), transistor Q9 is caused to switch on which imposes a voltage at the base of transistor Q5 causing it to turn on and impose a voltage on R51 and through resistors R39 and R38 to the gate of SCR5 thus causing it to conduct as long as transistor Q9 conducts. As explained before, conduction of SCR5 disenable Q1 and prevents its from generating firing pulses for SCR3 and SCR4. Thus when overvoltage occurs all firing pulses are terminated. As a result the output voltage between output terminals X3 and X4 drops and, when it drops sufficiently, Zener diodes Z6 and Z7 will cease conducting and Q9 will switch off and again allow SCR5 to function in the normal mode. SCR5 performs a dual role in that it provides overvoltage cut-off and eliminates superfluous relaxations of unijunction Q1 that are not necessary for firing purposes after the first relaxation has occurred. Thus at heavy loads upon the converter or with heavy direct current demand, the firing train components will have less tendency to heat up and all unnecessary gate pulses will be eliminated.

When SCR5 conducts, it shorts the emitter of unijunction Q1 to ground. By this means, all pulses through the firing train are cancelled when desired as follows:

(a) When phase lag is short due to increased input, unwanted pulses are generated by Q1, as described. Phase lag is indicated as $\theta$ in FIG. 1A. Q1 fires at time $\theta$. If SCR5 did not operate, more pulses would be generated by Q1.

(b) If the firing train is applied to the gates of SCR3 and SCR4 before control voltage has time to build up, some hysteresis and random firing may result. Partial voltage applied to Q1, Q2, Q3, Q4 and Q5 can cause noise and resultant random firing. This is hysteresis by virtue of feedback from Q5 to SCR5. The latter will now fire the SCR's 3 and 4, causing double triggering of the inverter SCR's and consequent battery short circuit. Some discrete time (milliseconds) must lapse before firing is initiated. Referring to FIG. 1, diode D30, capacitor C35 and resistors R51 and R100 function to keep the gate of SCR5 energized until direct current amplitude stability is achieved. Thus firing cannot occur until steady state conditions are realized. The transient delay time due to C34, R51 and R100 overlaps the settling time of the DC control system. That is, the R100, C35, R51 time constant overlaps the settling time of the DC control.

(c) Overvoltage protection is achieved by unijunction Q1 pulse cancellation, in turn dependent on SCR5 which shorts the emitter of Q1 to ground when it conducts. When overvoltage occurs at the output, Q8 is switched on by the spillover action of Z6 and Z7 in series with R58 and R59. The collector of Q8 is connected to the base-ground resistor of Q9. Since Q9 is a PNP-transistor, the negative voltage resulting from voltage divider effect of R50 and R57 causes triggering of Q9. Thus Q9 injects current into the base of Q5 and causes its emitter to build up and trigger SCR5 via R39. When the "killer" SCR5 is triggered by overvoltage, it cancels firing pulses by disabling Q1 so as to reduce the output. Although the latter control has a saw-tooth characteristic, the resultant output voltage variation is relatively smooth.

The circuit may be provided with an alarm circuit 10 (FIG. 2) which provides a warning, e.g. operates an alarm, if the output voltage is too high or too low. The construction of circuits of this type is known to those skilled in the art so that no detailed discussion is believed necessary.

The circuit may also be provided with a current limiting feature, indicated by the block 12 in FIG. 2. The current limit system derives its driving voltage across L7, D25 and the ammeter A (composite drop).

The composite drop is bucked by a set voltage drop in the current limit circuit. If the composite drop exceeds the set drop, an output voltage is provided on line H5. This voltage on line H5 may be coupled to either the base of transistor Q20 or the base of transistor Q8, through a coupling diode.

In the former case, transistor Q7 will be forward biased to an extent that causes phase lag in the firing circuit. That is, conduction of Q7 affects the charging time of capacitor C2 and hence affects the firing rate of unijunction Q1. The base terminal of transistor Q20 is designated by the reference numeral 100 in FIG. 2. Various voltage wave forms may be applied to terminal 100 to influence the charging time of capacitor C2 and hence influence the rate of oscillation of unijunction Q1 in various ways.

In the case where the voltage on line H5 is coupled to the base of transistor Q8, it will trip the "killer" circuit i.e. make SCR5 conductive, in a manner similar to that of the overvoltage protection feature described previously. The base 100 of transistor Q20 has a "summing junction" function and the lead H5 from the current limit system 12 can be introduced at this joint. Resistor R94 is a thermistor shunted by resistor R95. When the temperature is high, the thermistor network compensates by shunting the summing junction 100 so as to allow earlier firing with consequent compensation of the output. The principal function of Q20, however, is to accept feedback at high impedance via isolating diode D24 and provide the base network of Q7 with a feed-back signal. Feed-back is derived via a resistor R99 connected on a tap on a variable resistor R101 connected across diode D25 and inductor L7. Notes on Feedback:

If R99 samples voltage at the extreme left of R101, the drop across L7, D25 and A will not be corrected for by negative feedback and the output will drop accordingly. If R99 samples voltage at the extreme right of R101, the drop across L7, D25 and A will be accounted for but the "Nyquist" point may be transgressed so that oscillation occurs. At the left of R101 some ripple exists at a particular phase angle compatible with system stability. This ripple counteracts the natural phase angle of closed loop oscillation and contributes to system stability. Some compromise between both states was necessary, thus a combination of pulsating and output sensing was achieved by the use of the divider R101 with the cut-in point of R99 at the compromise ratio point.

What I claim as my invention is:

1. A DC to DC power supply wherein a source of DC voltage charges a capacitor and wherein said capacitor is periodically discharged alternately through first and second halves of a transformer primary winding wound on a saturable magnetic core, said first and second halves being connected in series with first and second silicon controlled rectifiers respectively, the improvement comprising means for causing said capacitor to first discharge through said second half of said primary winding when said power supply is turned on and means for causing said capacitor to discharge last through said first half of said primary winding when said power supply is turned off whereby said capacitor is prevented from discharging through that half of the primary winding which will drive sad core towards saturation in the sense caused by the immediately preceding capacitor discharge.

2. A power supply as claimed in claim 1 wherein, during normal operation of the power supply, said first and second silicon controlled rectifiers are alternately triggered on by pulses supplied via first and second firing trains, respectively, said pulses being derived from a flip-flop which is alternately triggered into first and second conduction states by means of a unijunction oscillator connected thereto.

3. A power supply as claimed in claim 2 wherein said flip-flop comprises first and second transistors and said means for causing said capacitor to first discharge through said second half of said primary winding comprises means for maintaining said second transistor conductive and said first transistor non-conductive until said capacitor has charged to a voltage substantially equal to the voltage of the DC source at which time said second transistor is made conductive and said first transistor non-conductive whereby said second transistor applies a pulse via said second firing train to the gate of said second silicon controlled rectifier which is thus rendered conductive so that said capacitor discharges through said second half of said primary winding.

4. A power supply as claimed in claim 3 wherein said first and second transistors are NPN transistors and said means for maintaining said second transistor conductive and said first tranistor non-conductive until said capacitor has charged to a voltage substantially equal to the voltage of the DC source comprises a PNP transistor having an emitter connected to the base of said first transistor, a collector connected to the emitter of said first transistor and a base conneced to a second capacitor adapted to be charged by said DC voltage source, said PNP transistor being conductive when said power supply is initially turned on so that said first transistor is maintained non-conductive until said second capacitor charges to a voltage whereat said PNP transistor is rendered non-conductive thereby turning on said first transistor.

5. A power supply as claim 4 wherein said silicon controlled rectifiers each have an anode, cathode and gate and wherein voltage surge suppressors are connected between said anodes and cathodes.

6. A power supply as claimed in claim 1 wherein said capacitor is periodically discharged at a first repetition rate, said transformer having a secondary winding connected to a full-wave rectifier having two diodes and third and fourth silicon controlled rectifiers, said transformer also having an auxiliary winding connected to a full-wave control bridge rectifier having a pulsating DC output at said first repetition rate, the output of said control bridge rectifier energizing a unijunction oscillator adapted to provide at its output pulses having a second repetition rate higher than said first repetition rate and means coupled to the output of said unijunction oscillator and to the gate electrodes of said third and fourth silicon controlled rectifiers to make conductive that silicon controlled rectifier having its anode-cathode path forward biased.

7. A power supply as claimed in claim 6 including means for disabling said unijunction oscillator after it produces a pulse at the beginning of each pulse at said first repetition rate received from said control bridge rectifier, said means maintaining said unijunction oscillator disabled until the end of the pulse received from said control bridge rectifier.

8. A power supply as claimed in claim 7 wherein said unijunction oscillator has a unijunction transistor having an emitter, a base-one and a base-two and said disabling means comprises a fifth silicon controlled rectifier having a cathode, an anode and a gate electrode, the anode of said fifth silicon controlled rectifier being connected to the emitter of said unijunction transistor, the cathode of said fifth silicon controlled rectifier being connected to the base-one of said unijunction transistor and the gate electrode of said fifth silicon controlled rectifier being connected to said means coupled to the output of said unijunction oscillator.

9. A power supply as claimed in claim 8 wherein said means coupled to the output of said unijunction oscillator includes a transistor adapted to be rendered conductive by a pulse from said unijunction oscillator to pass current through a resistor to thereby produce a pulse across said resistor, the pulse across said resistor being coupled to the gate electrode of said fifth silicon controlled rectifier to thereby render it conductive, conduction of said fifth silicon controlled rectifier causing said unijunction transistor to be disabled.

10. A power supply as claimed in claim 6 wherein the means coupled to the output of said unijunction oscillator includes a second transistor having an emitter-collector path connected across the output of said control bridge rectifier and a base connected to the output of said unijunction oscillator whereby an output pulse from said unijunction oscillator renders said second transistor conductive, the collector of said second transistor being connected to the base of a third, normally conducting, transistor which switches off rapidly when said second transistor is rendered conductive, the third transistor having a collector connected to the base of a fourth transistor connected as an emitter follower which conducts through a resistor when the third transistor switches off to produce a voltage pulse across said resistor which is coupled to the gate electrodes of said third and fourth silicon controlled rectifiers.

11. A power supply as claimed in claim 9 wherein said full-wave bridge rectifier has a pair of output terminals and sensing means are connected across said output terminals for producing an output voltage upon sensing a voltage in excess of a predetermined voltage, said output voltage beign coupled to means responsive to said output voltage for rendering said transistor conductive.

12. A power supply as claimed in claim 9 wherein a summing junction system accepts feedback voltage and compensation bypass by means of a thermistor so as to maintain constant output at high temperature.

References Cited

UNITED STATES PATENTS

| | | | |
|---|---|---|---|
| 3,133,241 | 5/1964 | White | 321—45 |
| 3,237,126 | 2/1966 | Baycura et al. | |
| 3,315,146 | 4/1967 | Paice | 321—45 |
| 3,325,716 | 6/1967 | Gomi | 321—2 |
| 3,348,130 | 10/1967 | Jensen | 321—18 X |
| 3,439,252 | 4/1969 | Sikes et al. | 321—11 |

J. D. MILLER, Primary Examiner

W. H. BEHA, Jr., Assistant Examiner

U.S. Cl. X.R.

321—11, 14, 18, 19, 45